US009475274B2

(12) United States Patent
Gastaldi et al.

(10) Patent No.: US 9,475,274 B2
(45) Date of Patent: Oct. 25, 2016

(54) METHOD FOR PRODUCING DECORATIVE ELEMENTS, PARTICULARLY INSIGNIA

(71) Applicant: DEMAK S.R.L, Turin (IT)

(72) Inventors: Maurizio Gastaldi, Turin (IT); Alberto Menozzi, Turin (IT)

(73) Assignee: Demak S.R.L, Turin (IT)

( * ) Notice: Subject to any disclaimer, the term of this patent is extended or adjusted under 35 U.S.C. 154(b) by 0 days.

(21) Appl. No.: 14/440,398

(22) PCT Filed: Nov. 15, 2013

(86) PCT No.: PCT/IB2013/060154
§ 371 (c)(1),
(2) Date: May 4, 2015

(87) PCT Pub. No.: WO2014/080325
PCT Pub. Date: May 30, 2014

(65) Prior Publication Data
US 2015/0273814 A1    Oct. 1, 2015

(30) Foreign Application Priority Data

Nov. 21, 2012    (IT) .............................. TO2012A1013

(51) Int. Cl.
*B32B 3/02* (2006.01)
*B41F 15/00* (2006.01)
(Continued)

(52) U.S. Cl.
CPC ................. *B41F 15/00* (2013.01); *B32B 3/02* (2013.01); *B32B 7/12* (2013.01); *B32B 27/08* (2013.01);
(Continued)

(58) Field of Classification Search
CPC .......... Y10T 428/24802; B32B 27/08; B32B 27/36; B32B 27/308; B32B 7/12; B32B 2250/05; B32B 2451/00; B32B 2605/00
See application file for complete search history.

(56) References Cited

U.S. PATENT DOCUMENTS

| 4,332,074 A | 6/1982 | Auld et al. |
| 4,615,754 A | 10/1986 | Waugh et al. |
| 2002/0142111 A1 | 10/2002 | Auld et al. |

FOREIGN PATENT DOCUMENTS

| EP | 2 311 689 A1 | 4/2011 |
| WO | 2007/060695 A1 | 5/2007 |

OTHER PUBLICATIONS

International Search Report for PCT/IB2013/060154 dated Mar. 17, 2014 [PCT/ISA/210].
(Continued)

*Primary Examiner* — Elizabeth Mulvaney
(74) *Attorney, Agent, or Firm* — Sughrue Mion, PLLC

(57) ABSTRACT

The method comprises the steps of: preparing a multiple-layer film (10) comprising a first transparent protective layer (12), a second decorative layer (14) containing at least one pigment made of metal having a melting point below 250° C., and a third supporting layer (16) of thermoformable plastic material, at least a portion (13) of the surface of the first layer (12) opposite the second layer (14) being screen-printed with a polyurethane and/or acrylic based ink; thermoforming the film (10) at a temperature in the range from 130 to 180° C. and at a pressure in the range from 10 to 20 bar, in such a way as to form at least one recess (28) therein; pouring into the recess a thermosetting resin (30) which adheres to the third layer (16) of the film (10); making a covering sheet (32) adhere to the third layer (16) of the film (10) so as to enclose the poured resin (30), which undergoes a hardening process; and cutting the film (10) around the recess (28), thus producing a stratified decorative element comprising a portion of the film (10), a layer of resin (30) and a portion of the sheet (32).

10 Claims, 13 Drawing Sheets

(51) Int. Cl.
     *B44C 1/26*     (2006.01)
     *B32B 7/12*     (2006.01)
     *B32B 27/08*    (2006.01)
     *B32B 27/30*    (2006.01)
     *B32B 27/36*    (2006.01)
     *B32B 27/40*    (2006.01)
     *G09F 7/16*     (2006.01)
     *G09F 21/04*    (2006.01)
     *B60R 13/00*    (2006.01)

(52) U.S. Cl.
     CPC ........... *B32B 27/304* (2013.01); *B32B 27/308* (2013.01); *B32B 27/36* (2013.01); *B32B 27/40* (2013.01); *B44C 1/26* (2013.01); *G09F 7/16* (2013.01); *G09F 21/048* (2013.01); *B32B 2255/10* (2013.01); *B32B 2255/205* (2013.01); *B32B 2255/26* (2013.01); *B32B 2451/00* (2013.01); *B32B 2590/00* (2013.01); *B60R 13/005* (2013.01); *Y10T 428/24802* (2015.01)

(56) References Cited

OTHER PUBLICATIONS

Written Opinion for PCT/IB2013/060154 dated Mar. 17, 2014 [PCT/ISA/237].

METHOD FOR PRODUCING DECORATIVE ELEMENTS, PARTICULARLY INSIGNIA

CROSS REFERENCE TO RELATED APPLICATIONS

This application is a National Stage of International Application No. PCT/IB2013/060154 filed Nov. 15, 2013, claiming priority based on Italian Patent Application No. TO2012A001013 filed Nov. 21, 2012, the contents of all of which are incorporated herein by reference in their entirety.

BACKGROUND OF THE INVENTION

1. Field of the Invention

The present invention relates to the production of decorative elements, particularly glossy insignia which can be applied to various articles, such as the bodywork of motor cars and motorcycles, domestic appliances, bicycles, boats and the like. Typical examples of these insignia are the badges identifying the model and manufacturer, applied to the bodywork of a motor car.

2. Background

In a first known method, a glossy insignia of this type is produced by a process which has two distinct stages. In the first stage, a core having the desired profile is produced by injection moulding of plastic material, for example ABS. In the second stage, this core is immersed in a chromium plating bath so that it is covered with a bright coating layer which imparts a glossy reflective appearance to it.

However, this known method has a number of drawbacks. This is because the execution of the injection moulding and chromium plating stages requires skills of markedly different kinds, which are rarely present in a single business. These stages are therefore typically executed in different locations, resulting in complications in terms of logistics and organization. The chromium plating stage also requires the use of chemical products which constitute a health risk, and the handling of these products therefore requires compliance with burdensome safety regulations, and their disposal in an environmentally compatible way is difficult in all circumstances. For its part, the injection moulding stage requires the availability of moulds which can withstand the high pressures required by this kind of technology. These moulds are therefore very expensive, making their preparation economically justifiable only in the case of long production runs.

A further known method for producing insignia of the aforesaid type is described in WO-2007/060 695.

One object of the present invention is to overcome the aforementioned drawbacks of the first known method.

Further objects of the present invention are those of improving the glossiness and aesthetic impression created by the decorative elements and increasing their resistance to the stretching stresses occurring during the production process and to mechanical and chemical attacks to which they are exposed in use.

SUMMARY OF THE INVENTION

According to the invention, this object is achieved by means of a method having the characteristics claimed specifically in claim 1 below. Preferred characteristics of the method according to the invention are indicated in the claims dependent on claim 1.

The method according to the invention has a series of stages which can easily be executed in a sequential way in a single installation, without the use of injection moulding and chromium plating methods. It is therefore easily applied, equally suitable for short and long production runs, and inexpensive, while having virtually no environmental impact.

The low-melting metallic pigments used for the decorative layer soften, or even melt, during the thermoforming step, and then resolidify after cooling, in such a way that the film conveniently resists the stretching stresses, and the properties of glossiness of the articles produced remain substantially unaltered.

By screen-printing one or more portions of the externally visible surface of the film, the aesthetic effect of the insignia is improved, being enhanced by the contrast between the non-screen-printed parts, which retain their metallic, "chromium-plated" appearance, and the screen-printed parts, which have one or more desired colours according to the type of ink used.

The high-pressure thermoforming step is carried out in such a way as to maintain the detail of the contrast between the previously screen-printed parts and the non-screen-printed parts, avoiding misalignments which might adversely affect the appearance of the insignia.

In one embodiment of the invention, the partially screen-printed surface of the film may be additionally coated with a polyurethane-acrylic varnish which is cross-linked in two stages. The first stage of cross-linking (or drying) takes place before the thermoforming step, while the second stage of cross-linking takes place subsequently by exposure to UV radiation, as the final stage, either before or after the cutting step. Thus the insignia is provided with further protection which guards it from attack by chemical agents and mechanical action such as scratching, abrasion and the like to which it is inevitably subjected during use.

A further object of the present invention is a decorative element which can be produced by using the aforementioned method.

This decorative element has the advantageous property of being highly flexible. It can therefore be adapted to curved surfaces at the time of its application, without having to be produced with a corresponding specified curvature in advance.

BRIEF DESCRIPTION OF THE DRAWINGS

Other advantages and characteristics of the present invention will become clear from the following detailed description which is given by way of non-limiting example with reference to the attached drawings, in which.

DETAILED DESCRIPTION OF THE INVENTION

Figure 1:
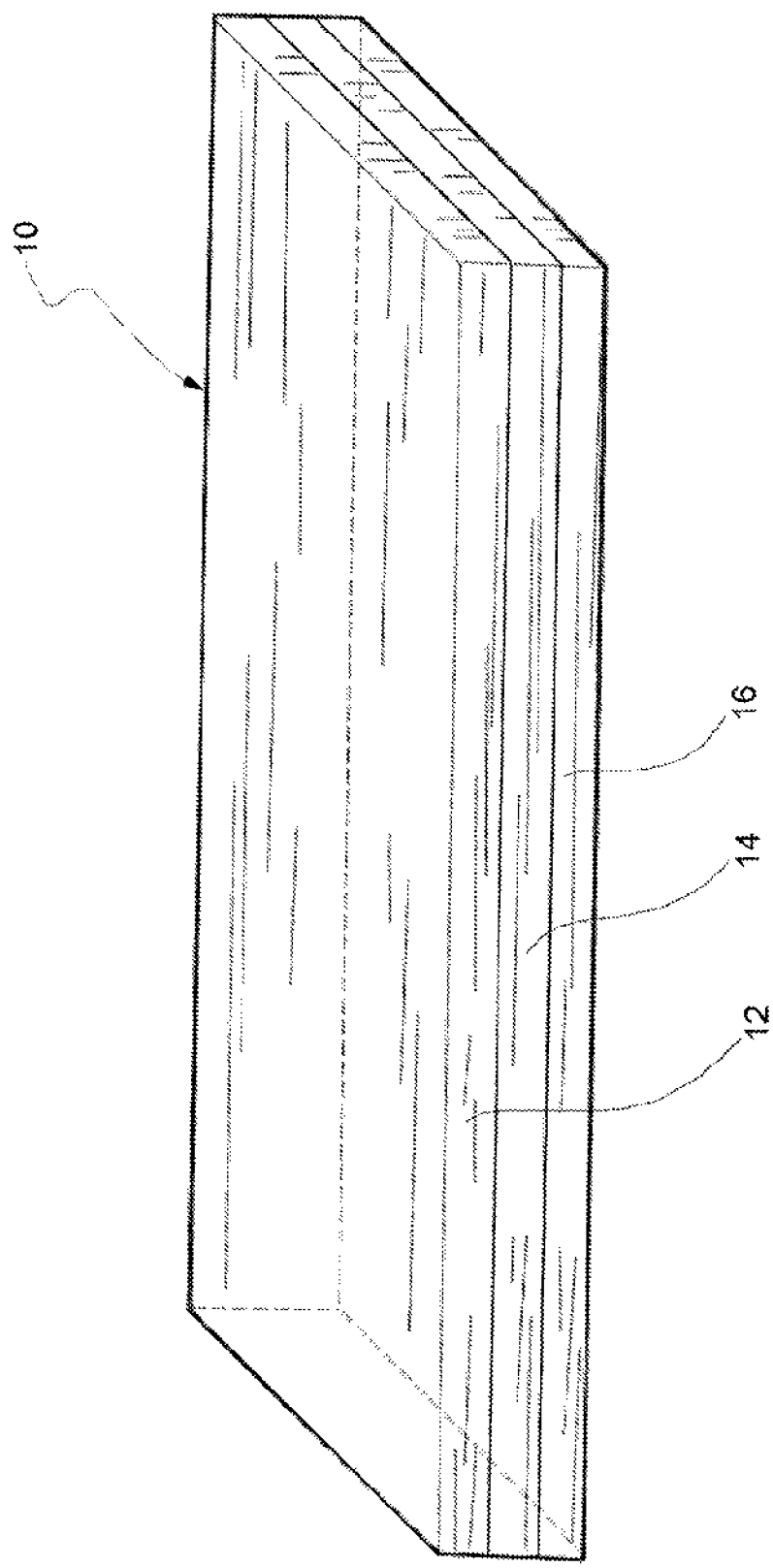
FIGS. 1 to 13 are schematic illustrations of successive steps of a method for producing a decorative element according to the invention.

In a method for producing a decorative element, particularly an insignia, the starting material (FIG. 1) is a multiple-layer film 10 comprising a first transparent protective layer 12, a second decorative layer 14 containing one or more pigments, and a third supporting layer 16 of thermoformable plastic material.

Figure 2:
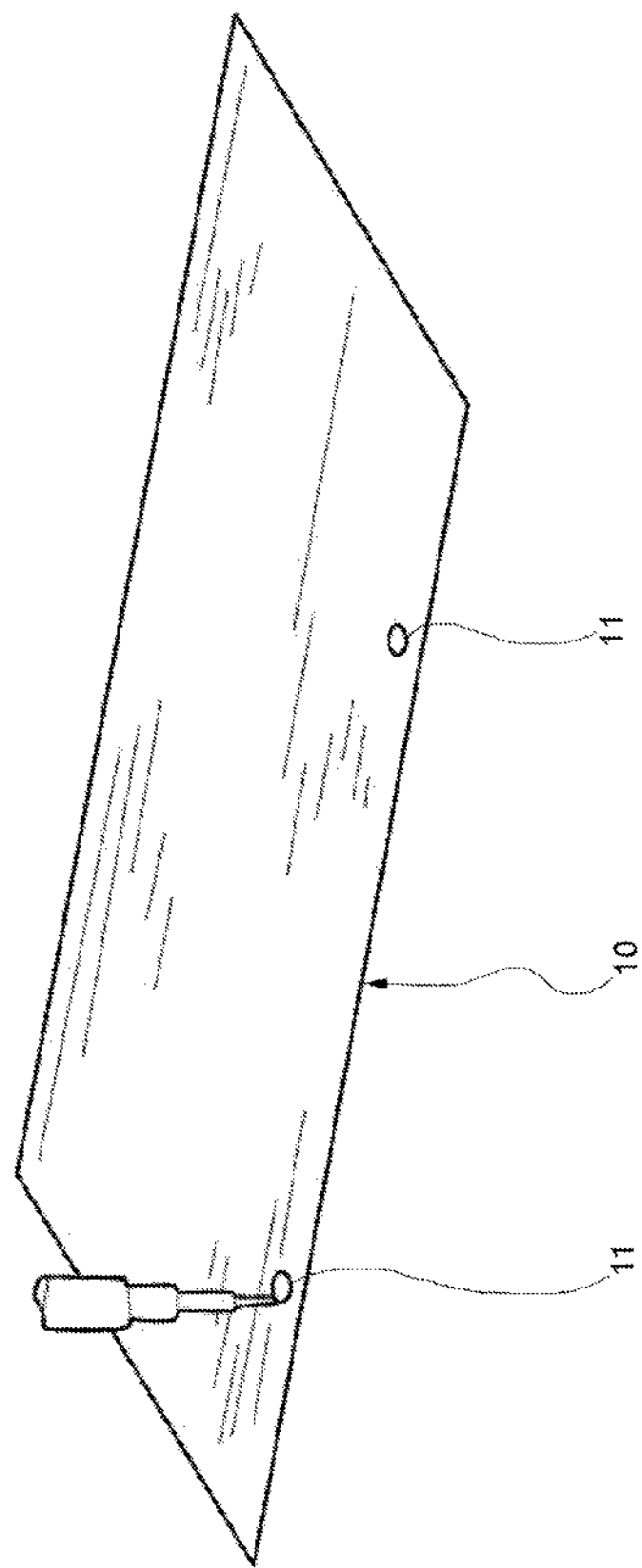
Figure 3:
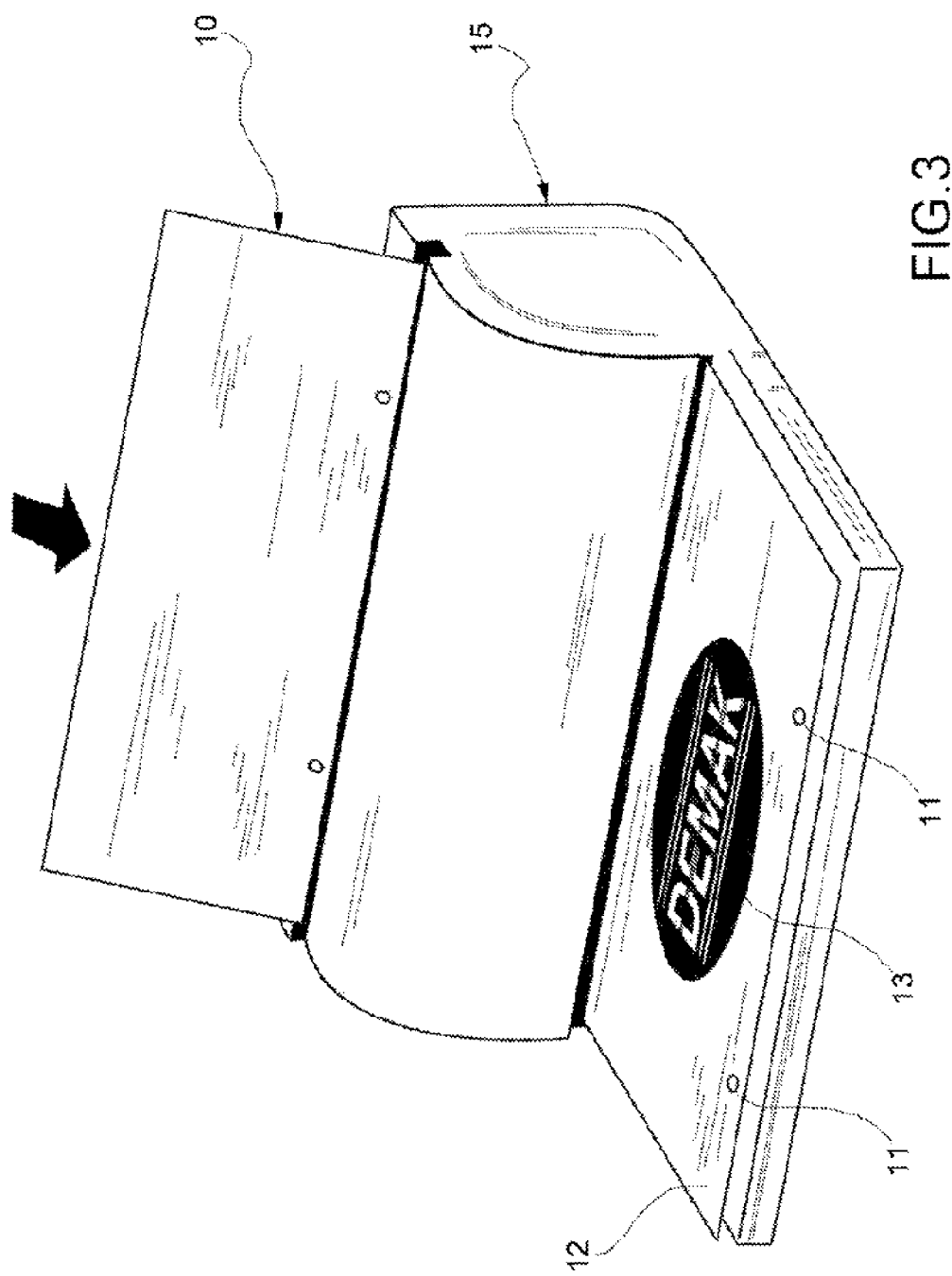

Holes 11 (FIG. 2) are initially made in the film 10, and are used for positioning the film in successive steps of the operation. After this (FIG. 3), a portion 13 of the surface of the first layer 12 opposite the second layer 14 of the film is screen-printed with a polyurethane and/or acrylic based ink in an apparatus 15 of a known type. The screen-printed portion 13 has an elliptical perimeter and encloses non-screen-printed parts having a profile corresponding to that of the letters of the word "DEMAK" and to horizontal lines which, because of the contrast with the portion 13, become particularly prominent. Clearly, in embodiments of the invention which are not illustrated, there could be a plurality of separate screen-printed portions of any shape or colour.

The surface of the partially screen-printed film 10 can finally be coated with a protective polyurethane-acrylic varnish which is cross-linked in two stages, the first of which takes place after its application and before further heat treatment of the film 10 as a whole, particularly a thermoforming step which is described in detail in the following part of the present description.

The first transparent protective layer 12 can consist, for example, of polyester, polyvinylidene fluoride or polymethyl methacrylate. The second layer 14 contains, for example, metallic pigments, while the third layer 16 can consist of a material such as ABS, polyurethane or polystyrene. The metallic pigments are made of elements having a melting point below 250° C., preferably indium and/or tin, and give the film 10 a glossy reflective appearance, a satin appearance, or any other known type of metallized appearance. The total thickness of the film 10 may typically be in the range from 200 to 500 μm.

Figure 4:
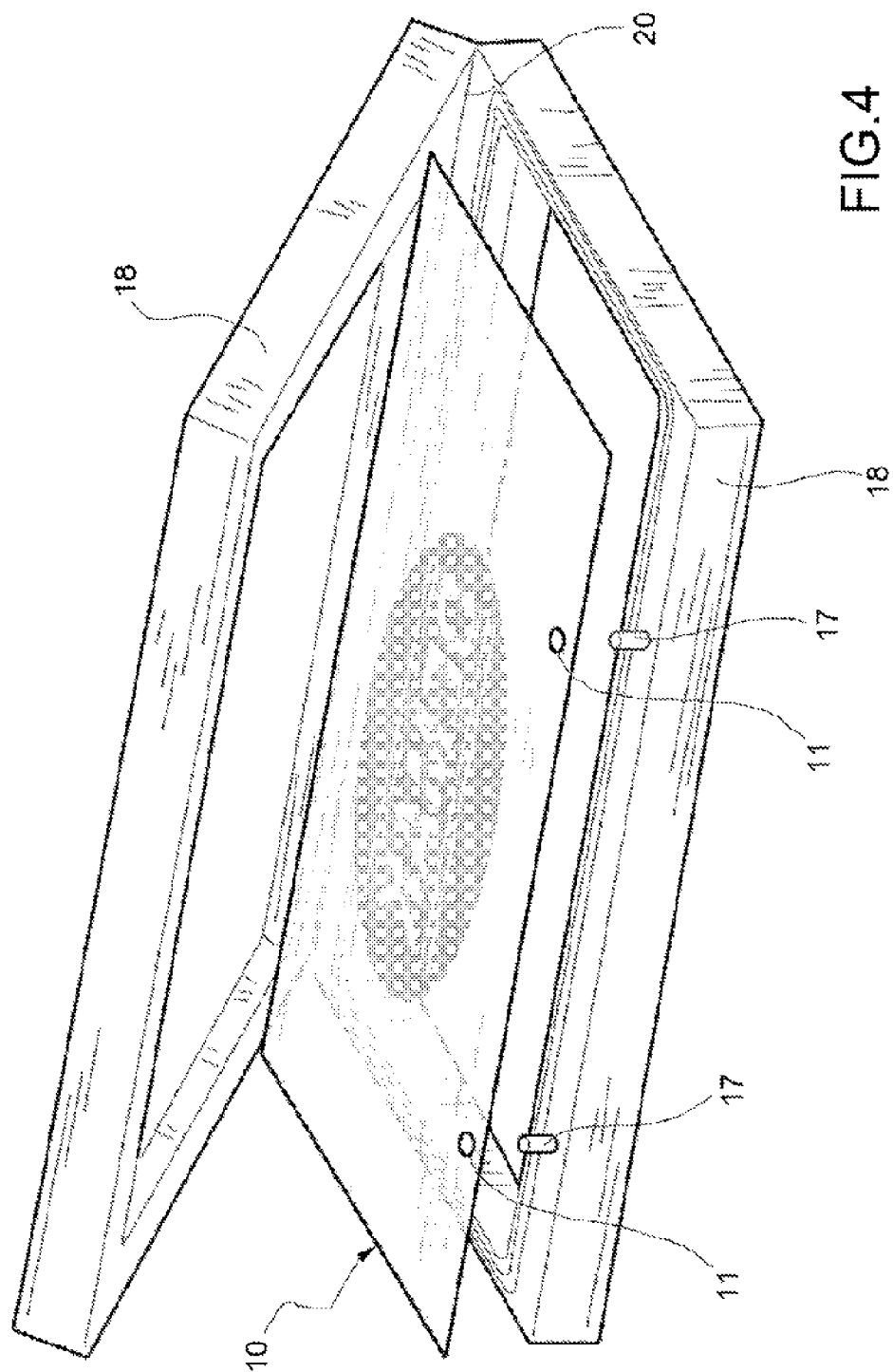
Figure 5:
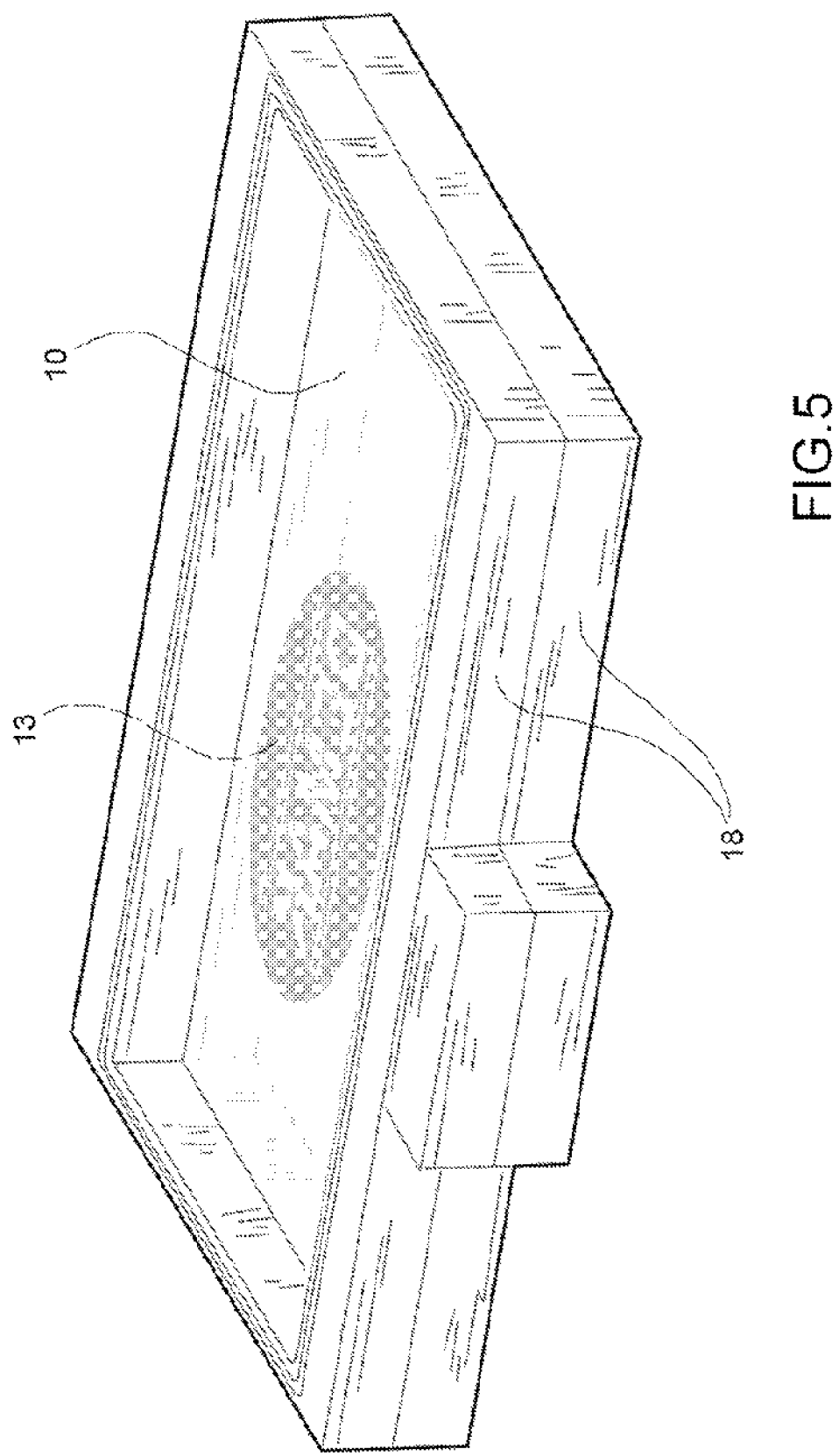
Figure 6:
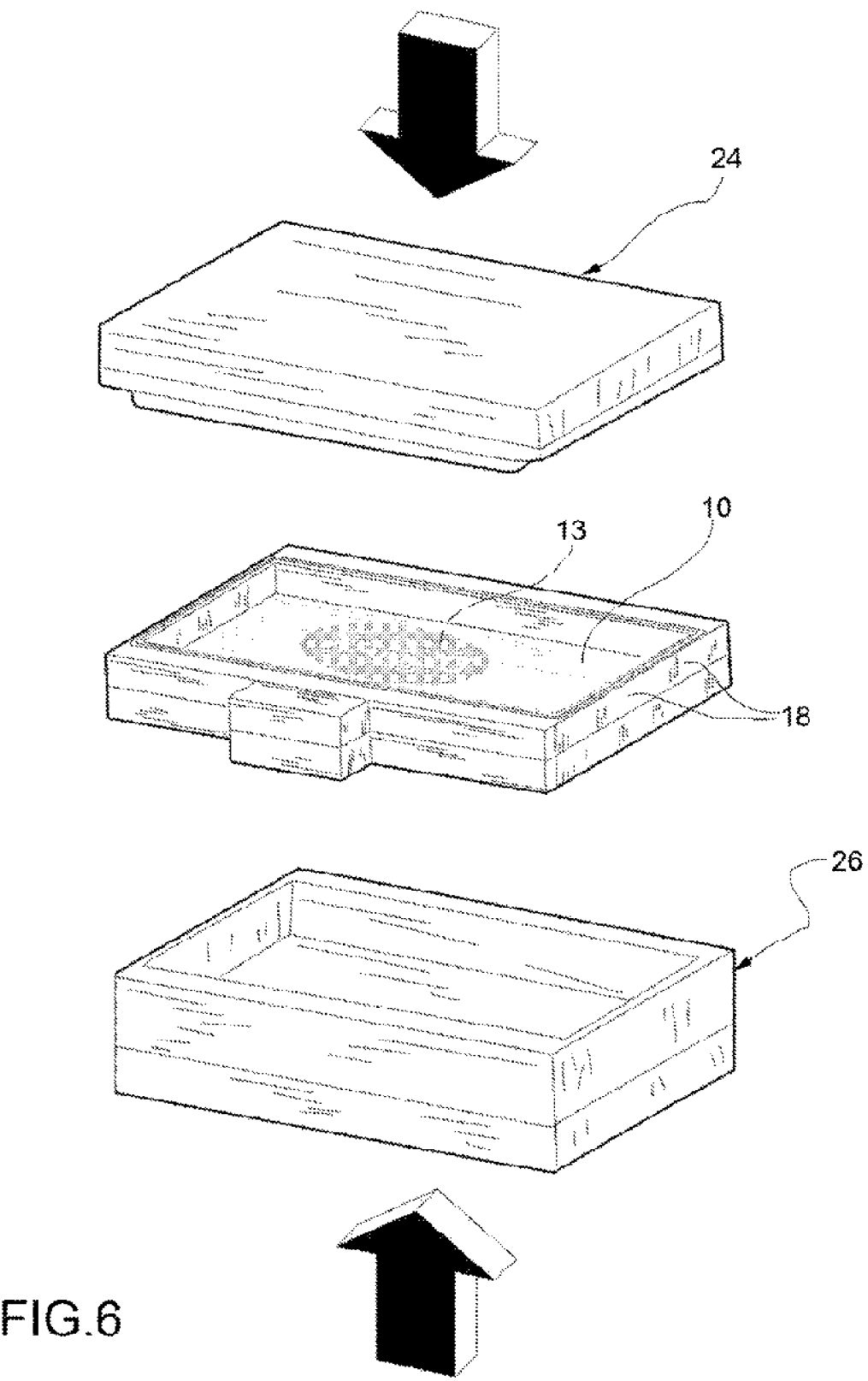
Figure 7:
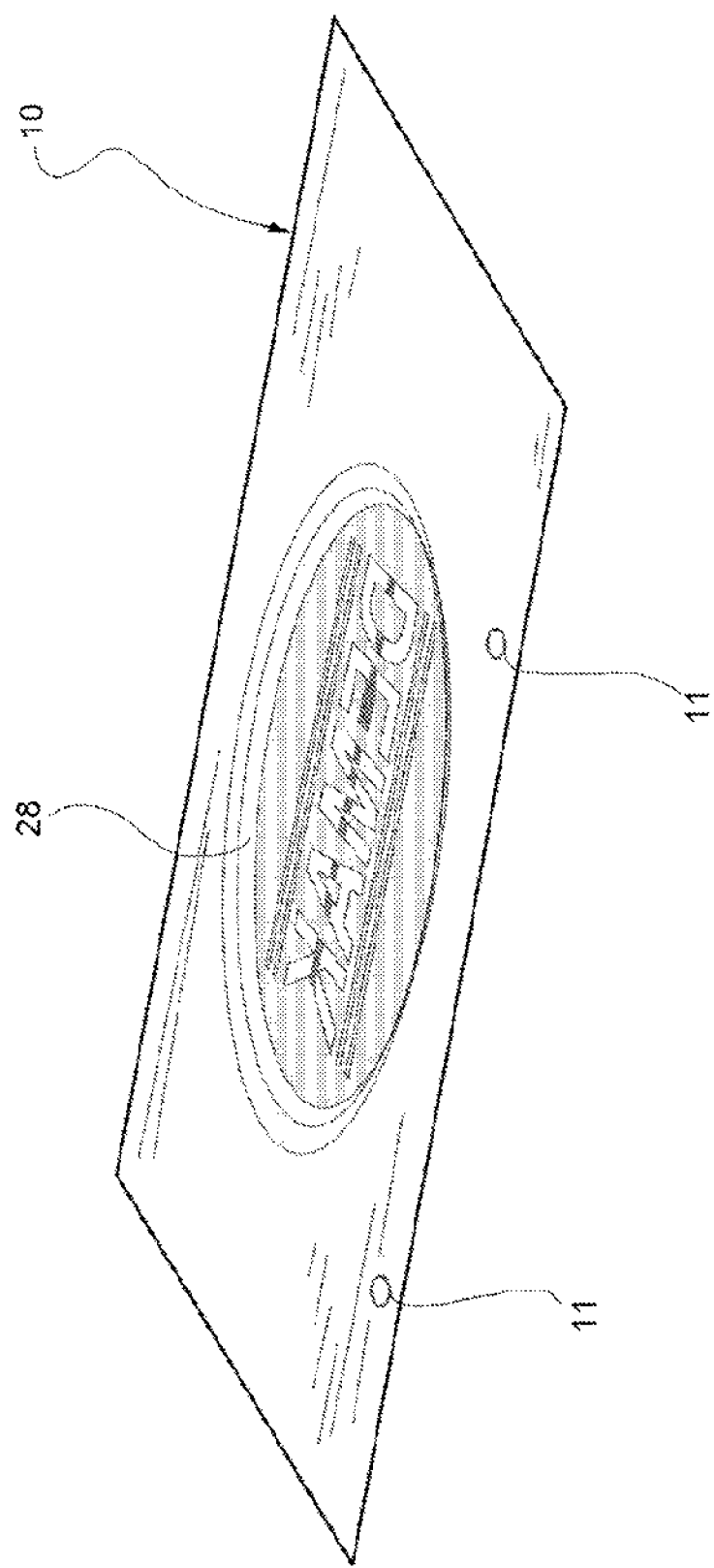

A rectangular portion of the multiple-layer film 10 described above is inserted (FIG. 4) into a holder formed by two substantially rectangular frames 18 hinged in a book-like way on one longer side 20. The frame 18 in the lower position has pins 17 on to which the holes 11 of the film 10 are fitted in order to ensure the correct positioning of the film. The two frames 18 are then closed on to each other (FIG. 5), thus securing the portion of film 10 along its perimeter. The film is then heated to a temperature preferably in the range from 130 to 180° C., and is clamped (FIG. 6) between a die 24 and a matrix 26 having, respectively, projections and recesses of the desired shape, so that it is thermoformed at a pressure in the range from 10 to 20 bar. The thermoforming produces a recess 28, whose shape corresponds to that of the insignia to be produced, in the portion of film 10 (FIG. 7). FIG. 7 shows a single recess 28 of elliptical shape, but evidently the thermoforming operation could lead to the formation of more than one recess, and these recesses could theoretically have any shape and may or may not be identical to each other.

Figure 8:
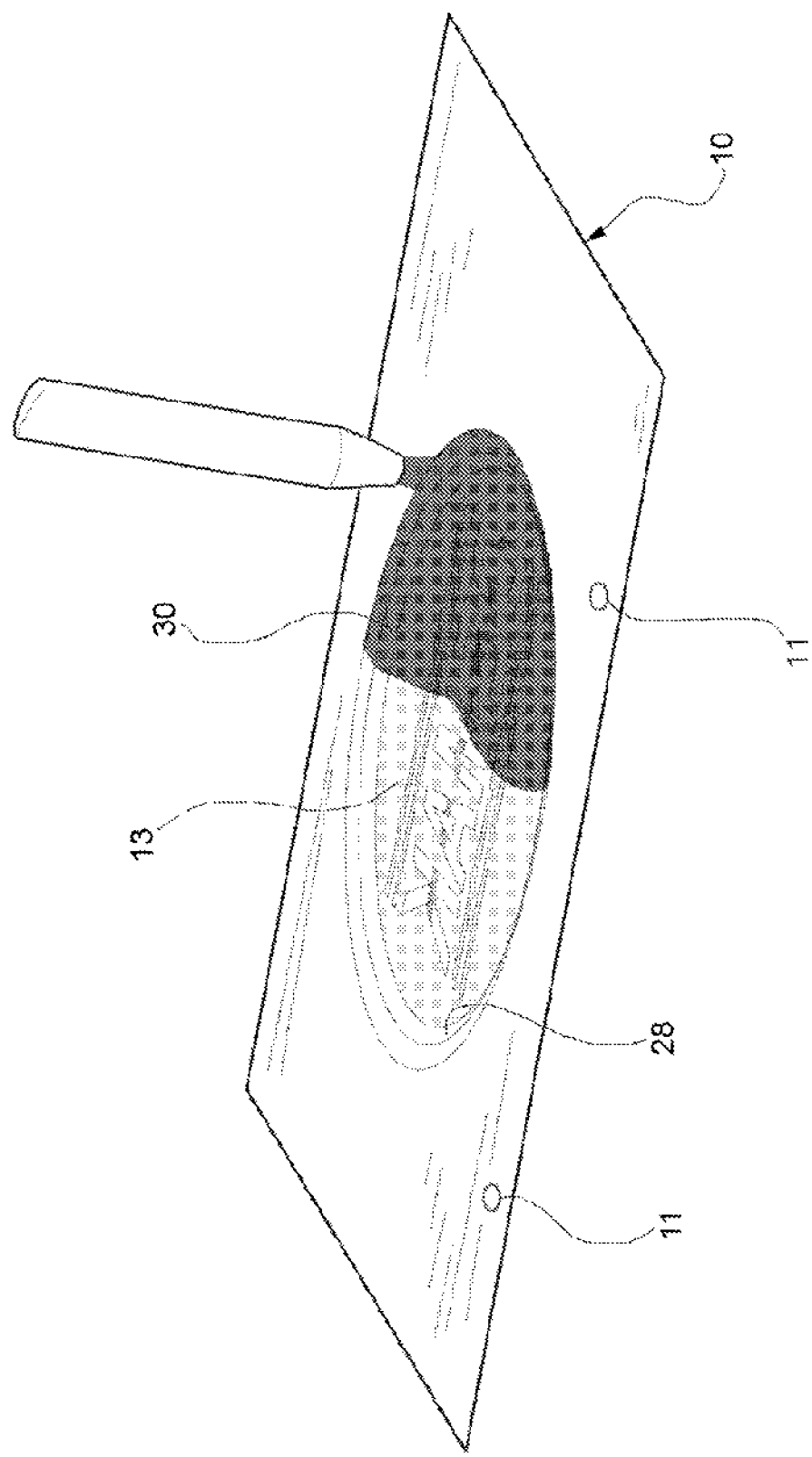
Figure 9:
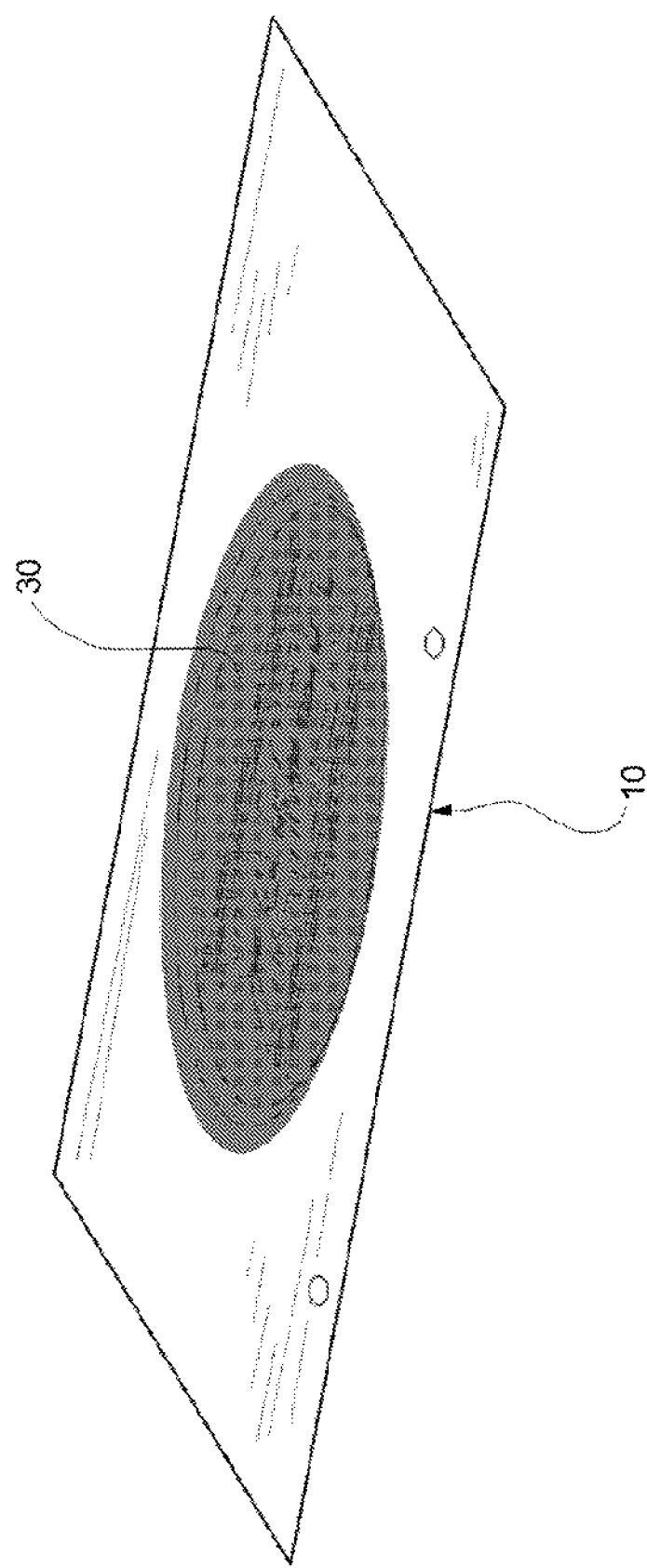

In a subsequent stage of the operation (FIG. 8), a thermosetting resin 30—typically of the polyurethane type—is poured into the recess 28 and adheres to the third layer 16. The thermoformed film 10 (FIG. 9) is strong and substantially self-supporting, and therefore does not require dedicated supporting devices either during the pouring stage, in which it acts as a containment vessel for the thermosetting resin, or afterwards.

Figure 10:
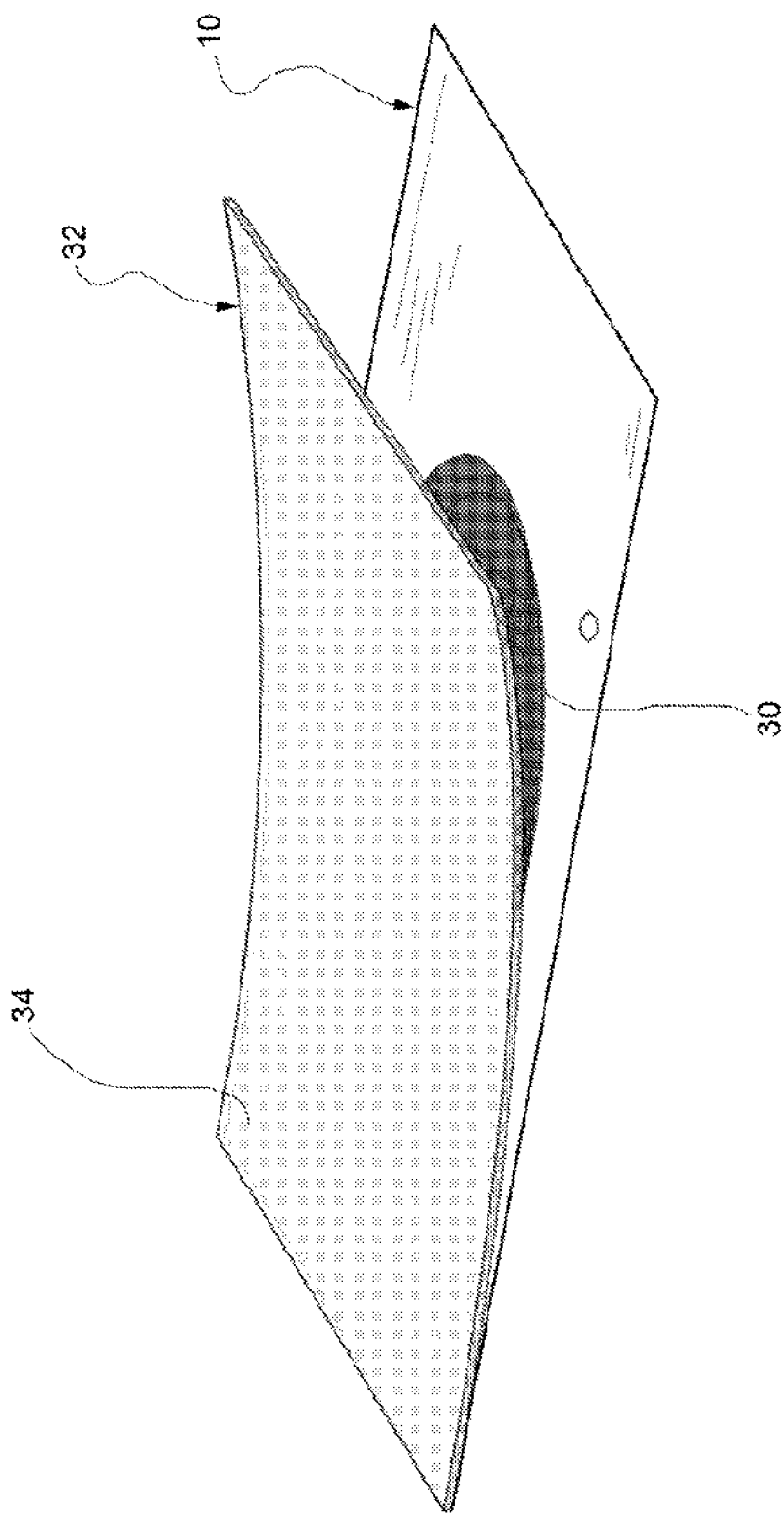

A covering sheet 32 is then applied (FIG. 10) to the non-recessed parts of the third layer 16 of the film 10 so as to enclose the resin 30 in the recess 28. Advantageously, the covering sheet 32 is of the double-sided adhesive type, and in particular comprises an inner layer enclosed between two adhesive outer layers, of which the one on the side facing away from the film 10 is covered with a protective liner 34 which is removable at the moment of application of the insignia to the substrate to be decorated.

Figure 11:
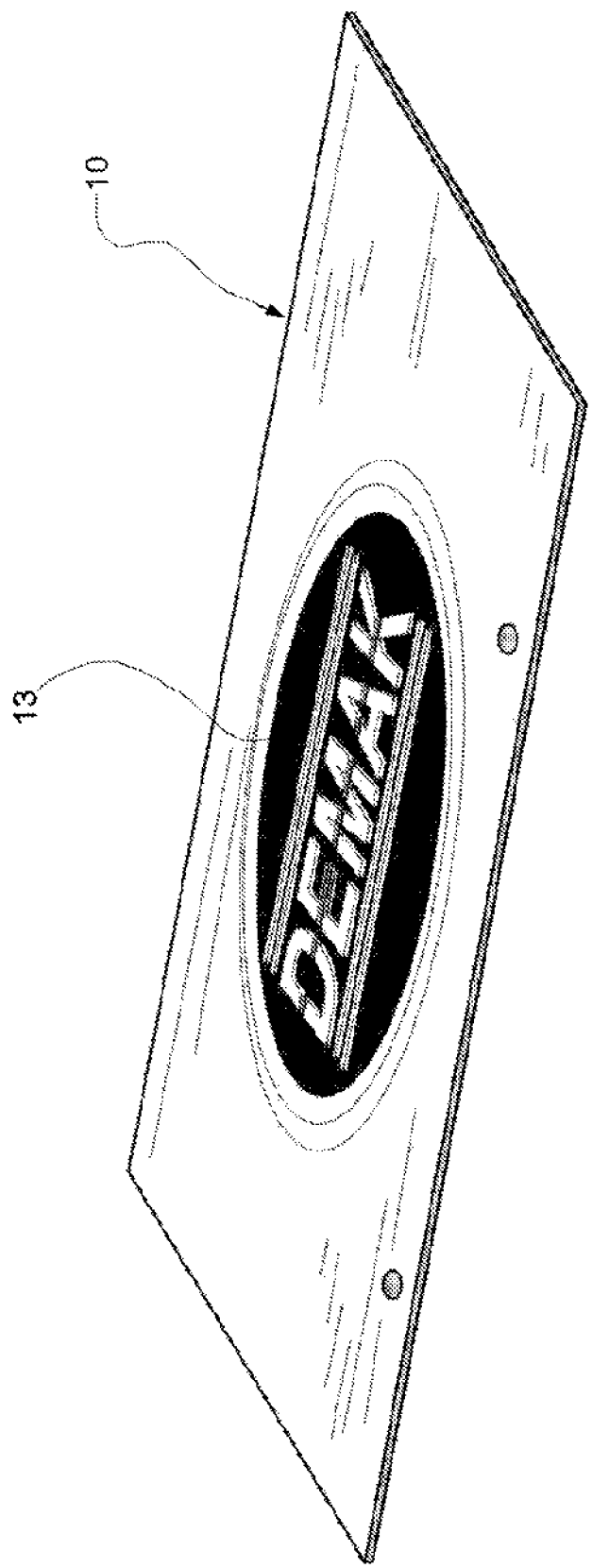

FIG. 11 shows the portion of film 10—after the sheet 32 has been made to adhere to the layer 16 (in other words, the reverse) of the film and to the resin 30 filling the recess 28—in a configuration which is inverted relative to that of the preceding drawings, thus revealing the contrast between the surface of the screen-printed portion 13 and the remaining surface of the layer 12 of the film 10.

The resin 30 enclosed in the recess 28 then undergoes a hardening process, which can be accelerated by heating in a kiln. This kiln heating can be carried out, if necessary, even before the adhesion of the covering sheet 32 to the third layer 16 of the film 10. The film 10 may also be exposed to UV radiation, in order for the second step of cross-linking of the varnish to take place, forming a protective coating against mechanical and chemical attack.

Figure 12:
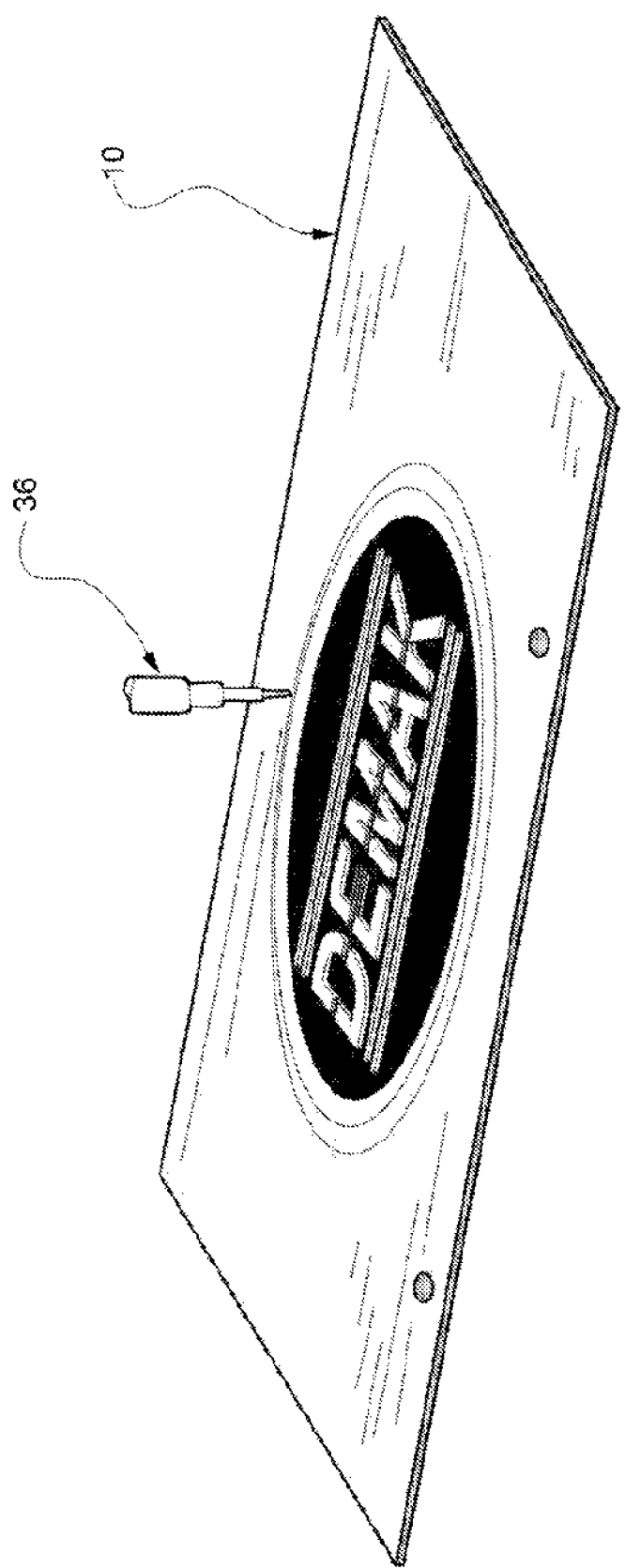
Figure 13:
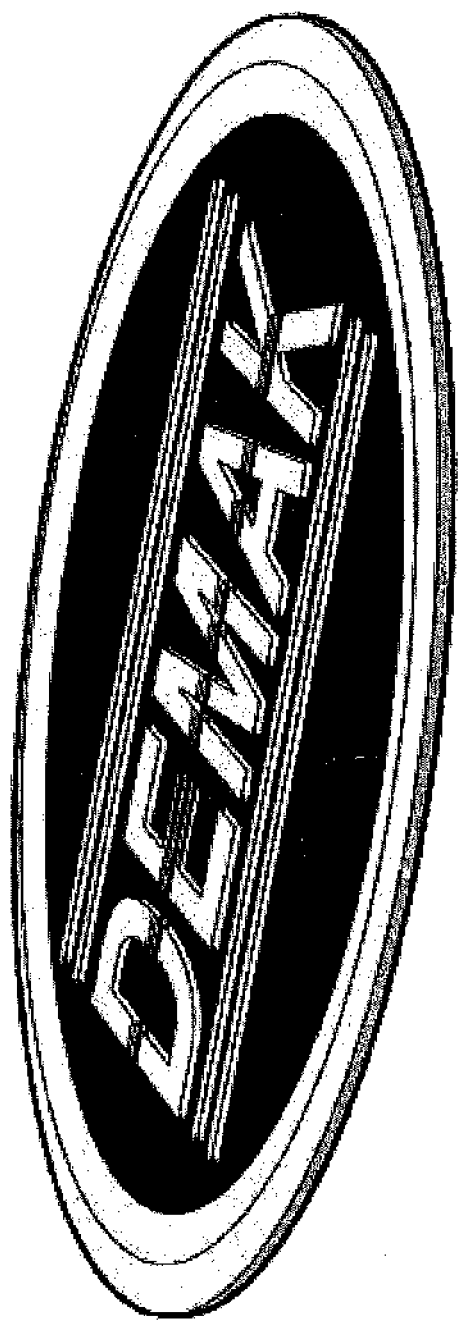

Finally (FIG. 12), a cutting device such as a punching machine or a laser beam machine 36 is used to cut the film 10 around the recess 28 filled with resin 30 and sealed by the sheet 32, thus producing (FIG. 13) an insignia 38 of elliptical shape. This insignia has a stratified structure comprising a layer of film 10, a layer of thermoset resin 30, and a covering sheet layer 32, which are superimposed on each other except in the area of the edge, where the sheet 32 adheres directly to the third layer 16 of the film 10 (see FIG. 10) without the interposition of the resin 30. In its turn, the layer of film 10 comprises a first transparent protective layer 12, a second decorative layer 14 containing at least one pigment, and a third supporting layer 16 of plastic material to which the thermoset resin 30 adheres. The visible surface of the film 10 also has a screen-printed portion 13 (in other words, the parts shown in black). Optionally, as mentioned above, the whole visible surface of the film 10 (in other words, both the screen-printed portion 13 and the non-screen-printed portion) may have a coating of transparent protective varnish which is not shown in the drawings.

Of course, provided that the principle of the invention is retained, the details of construction and the forms of embodiment can be varied widely from what has been described purely by way of example, without departure from the scope which has been claimed. In particular, the method according to the invention can be used to produce decorative elements which can theoretically be present in any number, shape or colour.

The invention claimed is:

1. Method for producing one or more decorative elements, particularly insignia (38), comprising the steps of:
   preparing a multiple-layer film (10) comprising a first transparent protective layer (12), a second decorative layer (14) containing at least one pigment made of metal having a melting point below 250° C., and a third supporting layer (16) of thermoformable plastic material, at least a portion (13) of the surface of the first layer (12) opposite the second layer (14) being screen-printed with a polyurethane and/or acrylic based ink,
   thermoforming said multiple-layer film (10) at a temperature in the range 130 to 180° C. and a pressure in the range 10 to 20 bar, so as to form at least one recess (28) therein,
   pouring into said at least one recess (28) a thermosetting resin (30) which adheres to the third layer (16) of the film (10),
   making a covering sheet (32) adhere to the third layer (16) of the film (10) so as to enclose the poured resin (30), which undergoes a hardening process, and
   cutting the film (10) around said at least one recess (28), thus producing a stratified decorative element comprising a portion of said film (10), a layer of resin (30) and a portion of said sheet (32).

2. Method according to claim 1, in which said first transparent protective layer (12) of the multiple-layer film

(10) is made of a plastic material selected from the group consisting of polyesters, polyvinylidene fluoride and polymethyl methacrylate.

3. Method according to claim 1, in which said second layer (14) of the multiple-layer film (10) contains indium and/or tin pigments, giving the film (10) a glossy reflective or satin appearance.

4. Method according to claim 1, in which said multiple-layer film (10) has a thickness in the range 200 to 500 μm.

5. Method according to claim 1, in which the at least partially screen-printed surface of the film (10) is coated with a polyurethane-acrylic varnish which is cross-linked in two stages, the first stage taking place before said thermoforming step, and the second stage taking place subsequently by exposure to UV radiation before or after said cutting step.

6. Method according to claim 1, in which a single recess or a plurality of recesses (28) is formed in said film (10) in the thermoforming step.

7. Method according to claim 1, in which the thermoformed film (10) acts as a self-supporting vessel into which the thermosetting resin (30) is subsequently poured.

8. Method according to claim 1, in which said thermosetting resin (30) is of the polyurethane type and, in order to bring about its hardening, it is subjected to a heating step, which takes place before or after the step of adhesion of the covering sheet (32).

9. Method according to claim 1, in which said covering sheet (32) is of the double-sided adhesive type, and in particular comprises an inner layer enclosed between two adhesive outer layers, of which the one on the side facing away from the film (10) is covered with a protective liner (34) which is removable at the moment of application of the decorative element.

10. Stratified decorative element, particularly insignia (38), which can be produced by the method according to claim 1, said decorative element comprising a film layer (10), a layer of thermoset resin (30) and a covering sheet layer (32) superimposed on each other.

\* \* \* \* \*